United States Patent [19]

Duynstee et al.

[11] Patent Number: 5,430,109
[45] Date of Patent: Jul. 4, 1995

[54] METHOD FOR MAKING A THERMOPLASTIC POLYMER

[75] Inventors: Eduard F. J. Duynstee; Lubertus Klumperman, both of Sittard, Netherlands

[73] Assignee: Stamicarbon B.V., Geleen, Netherlands

[21] Appl. No.: 114,248

[22] Filed: Sep. 1, 1993

Related U.S. Application Data

[63] Continuation of Ser. No. 474,825, Aug. 2, 1990, abandoned.

[30] Foreign Application Priority Data

Dec. 15, 1988 [NL] Netherlands ................. 8803069

[51] Int. Cl.⁶ ............... C08F 222/04; C08F 212/06
[52] U.S. Cl. ................ 525/327.4; 525/333.3
[58] Field of Search ............... 525/327.4, 333.3

[56] References Cited

U.S. PATENT DOCUMENTS 3,336,267  8/1967  Zimmerman et al. ............ 526/208
3,794,616  2/1974  Dennis et al. .
3,929,738  12/1975  Curtis, Jr. .

FOREIGN PATENT DOCUMENTS 221597  5/1987  European Pat. Off. .

OTHER PUBLICATIONS

Journal of Polymer Science, "Polymer Chemistry Edition", vol. 11, 1973, John Wiley & Sons, Inc. N. G. Gaylord et al.: Donor-acceptor complexes in copolymerization, XLIII. Cyclization of alternating and random styrene (Meth)acrylic ester copolymers, pp. 203–214.

*Primary Examiner*—Joseph L. Schofer
*Assistant Examiner*—Wu C. Cheng
*Attorney, Agent, or Firm*—Cushman Darby & Cushman

[57] ABSTRACT

The invention relates to a thermoplastic polymer based on a vinyl monomer, which is characterized in that the polymer composition contains more than 1% (wt) of one or more compounds according to formula I and/or II:

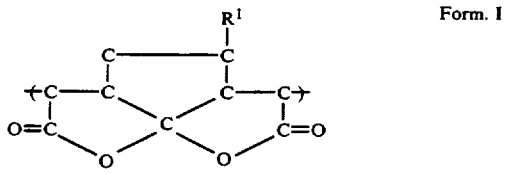

Form. I

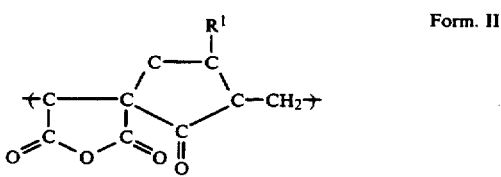

Form. II where R1 is a hydrogen atom, alkyl, aryl, cycloalkyl, cycloaryl and/or a halogen.

By applying a polymer according to the invention the composition is protected against thermal decomposition so that the $CO_2$ emission during or after processing is lower than 0.5% (wt). Polymers according to the invention are excellently suited for the production therefrom of dashboards for motor cars and of housings for electric equipment.

10 Claims, No Drawings

METHOD FOR MAKING A THERMOPLASTIC POLYMER

This is a Continuation of Ser. No. 07/474,825, filed Aug. 2, 1990, abandoned.

The invention relates to a thermoplastic polymer based on a vinyl monomer.

Known are polymers based on vinyl monomers and unsaturated dicarboxylic anhydrides. Examples are the copolymers of styrene and maleic anhydride (SMA). They are described in NL-A-8403489. The preparation of these copolymers can be effected via batch processes, as well as via continuous processes. The first commercial SMA copolymers were low-molecular products with molecular weights lower than 5000. These grades are used, for instance, in floor shampoos, floor polishes, emulsion paints and dispersants.

In addition to these low-molecular products there are also high-molecular SMA copolymers. These are important in, for instance, the automotive industry and in domestic articles.

Copolymers of styrene and maleic anhydride are usually prepared according to processes customary for, for instance, mass polymerization or polymerization in solution. Thus, according to for instance U.S. Pat. No. 2,971,939, it is possible to obtain copolymers of styrene and maleic anhydride by reacting the two monomers, styrene and maleic anhydride (MA), with each other in the presence of a peroxide. The polymerization can be better controlled when a solvent is used, for instance methylethyl-ketone, acetone, xylene, dioxane, ethylbenzene, dimethylformamide or toluene.

A 50:50 (molar) copolymer can be obtained by batchwise copolymerization of styrene and maleic anhydride, for instance by precipitation polymerization of styrene and maleic anhydride in aromatic solvents. Copolymers with a lower maleic anhydride content can be obtained if in a continuous copolymerization process a mixture containing much styrene and little maleic anhydride is introduced into a polymerization vessel at a high temperature during firm stirring and at the same time the same amount of polymerization mixture is being removed from the vessel (A. W. Hanson and R. L. Zimmermann, Industrial & Engineering Chemistry, Vol. 49, no. 11, pp. 1803-1807, 1957).

SMA copolymers can be processed in extrusion and injection moulding processes. The theoretical upper limit of the MA content is 50 moles % (alternating copolymers). Owing to their high softening point (220° C.), these products must be heated in the processing to high temperatures (for instance to 300° C.). This will cause the product to stick to the equipment. Besides, at such high temperature thermal decomposition of the copolymer takes place. In the process undesired separation of carbon dioxide occurs. For these reasons SMA copolymers with a relatively high maleic anhydride content are hard to process.

The object of the invention is to provide a thermoplastic polymer avoiding this disadvantage.

This object is achieved according to the invention in that the polymer contains more than 1% (wt) of one or more moieties according to formulas I and/or II:

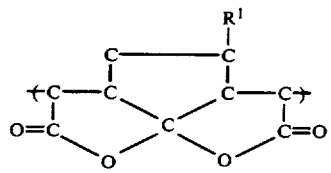
Form. I

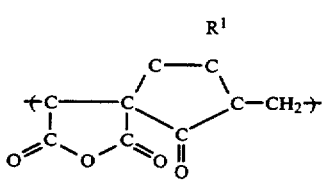
Form. II where R1 is a hydrogen atom, alkyl, aryl, cycloalkyl, cycloaryl and/or a halogen.

During the further processing, the polymer according to the invention shows a substantially lower thermal decomposition, which is apparent from, for instance, the reduced $CO_2$ emission.

The protection of copolymers against thermal decomposition is known per se from NL-A-8502834. In it a copolymer based on an alkenyl aromatic monomer and an unsaturated dicarboxylic anhydride, which shows little decomposition, is obtained by carrying out a polymerization process in an acid atmosphere, in which process the presence, during the polymerization, of 10-100 ppm of an acid calculated on the copolymer is sufficient to reduce the thermal decomposition of the copolymers thus produced.

The disadvantage of the known process of protecting the copolymer against thermal decomposition is that during the polymerization process acid is added, so that the polymerization takes place entirely in an acid atmosphere, for which reason the additives have to be adjusted to it. This reduces the choice of additives. This reduction and the acid affect the specifications of the end product. This disadvantage does not occur in a polymer according to the present invention.

According to a preferred embodiment of the invention the moieties pounds according to formulas I and II are prepared on the basis of a copolymer of a vinyl monomer and an unsaturated dicarboxylic anhydride. The copolymer has one or more parts consisting of 2 acid anhydrides linked by 4 C-atoms, an example of which is given in Formula III, the acid anhydrides preferably being non-substituted, or monosubstituted. Two of the four C-atoms mentioned are supplied by the vinyl monomer.

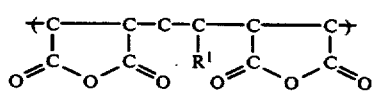
Form. III

Here R1 has the meaning described above.

The copolymer is heated to 200°-270° C. and kept at this temperature for some time. After some time, the melt is cooled again. The copolymer must not be kept at such a temperature too long, because secondary thermal decomposition processes will then come to play a significant part. Nor must the duration be too short, however, because the conversion according to the invention will then not yet be adequate.

During the heating a preferably strong, basic catalyst is added, although the reaction also proceeds without a catalyst.

The basic catalyst applied may, for instance, be a tertiary amine. Preference is given to using triethylamine (TEA). Being volatile, TEA can be evaporated after the reaction.

When a catalyst is added, the chosen temperature range is between 200° and 250° C., and preferably between 230° and 240° C. If no catalyst is added, the chosen range is between 230° and 270° C., and preferably between 250° and 260° C.

When a catalyst is added, the chosen heating period is preferably between 5 and 20 min. Most preferably 10 to 15 min. is chosen. If no catalyst is added, the chosen period is 15 to 20 min.

The polymer resulting after the heating may be cleared of residual monomers and/or catalyst by dissolving it in a suitable solvent (for instance acetone or butanone-2) and by subsequent precipitation in, for instance, methanol or heptane.

The reaction is possible also in a solution. The product is then precipitated and washed before being processed further.

In solution, TEA is less suited as a catalyst on account of its volatility. In that case preference is given to 1,1,1,-diazobicyclooctane (DABCO).

In the production of copolymers with a high MA content according to the state of the art, small amounts of the compounds according to formulas I and/or II may be formed also. On analysis of the relevant product it has been found that the amounts of the compounds according to formulas I and/or II remained below 1% (wt). The thermal decomposition is still too high.

A thermoplastic polymer composition according to the invention preferably has a remaining $CO_2$ emission during or after processing lower than 0.5% (wt). Also, the weight reduction during or after processing is much smaller than the weight reduction of a copolymer processed according to the state of the art. Further advantages are the increase of the dimensional stability under heat and of the chemical resistance without a decrease of the mechanical properties.

The thermoplastic polymer according to the invention preferably comprises the said elements in the following proportions:
- 50–80 moles % of a vinyl monomer;
- 0–30 moles % of a dicarboxylic anhydride and/or imide and
- 2–50 moles % moieties according to formulas I and/or II.

The thermoplastic polymer specifically comprises:
- 60–80 moles % of a vinyl monomer;
- 5–12 moles % of a dicarboxylic anhydride and/or imide and
- 8–30 moles % moieties according to formulas I and/or II.

The vinyl monomers that can be used in the polymers according to the invention are alkenes, such as ethylene, propylene, etc., (meth)acrylates, or vinylaromatic monomers such as styrene, α-methylstyrene, paramethylstyrene or mixtures hereof. Preference is given to the use of styrene.

The unsaturated dicarboxylic anhydrides used in the polymers according to the invention may be maleic anhydride, chloromaleic anhydride, dichloromaleic anhydride, citraconic anhydride, cyclohexylmaleic anhydride, benzylmaleic anhydride, itaconic anhydride, phenylmaleic anhydride, aconitic anhydride, propylmaleic anhydride, 1,2-diethylmaleic anhydride and mixtures hereof. Preference is given to the use of maleic anhydride, particularly 18–50 moles %.

The imides that can be used in the polymers according to the invention are N-phenylmaleimide, maleimide, citraconimide, itaconimide, aconimide, N-methylmaleimide and N-butylmaleimide. Preference is given to the use of N-phenylmaleimide.

Moulding compounds prepared according to the invention are suited for many uses. Thus many articles can be produced from it such as, for instance, dashboards for motor cars and cases and housings for electronic and domestic apparatuses.

The invention is further elucidated by means of the following examples and comparative experiments without being limited thereto.

EXAMPLES I UP TO AND INCLUDING IV

Into a glass tube 1 gramme SMA was introduced containing 0.5% (wt) DABCO. The MA content of the SMA copolymers used in these examples was 20–44% (wt). The tube was heated for 15 minutes at a temperature of 240° C.

The product resulting after this heating was purified by evaporating off the DABCO and any non-reacted monomers under high vacuum (10-7 bar) at 190° C.

COMPARATIVE EXAMPLES A UP TO AND INCLUDING D

Examples A up to and including D were not thermally treated according to the process described above. The SMA copolymers used in these examples again have an MA content of 20–40% (wt).

These copolymers were also purified in the manner described above under high vacuum at elevated temperature.

The products obtained according to the processes as described in examples I up to and including IV and in the comparative examples A up to and including D were subjected to a test for the purpose of determining the $CO_2$ emission:

The sample was heated for 30 minutes at 280° C. The escaping gas was analysed for the amount of $CO_2$, using an automatic titrator. The results are mentioned in table 1.

TABLE 1

|  | I | II | III | IV | A | B | C | D |
|---|---|---|---|---|---|---|---|---|
| Ma content* % (wt) | 20 | 26 | 35 | 44 | 20 | 26 | 35 | 44 |
| $CO_2$ emission % (wt) | 0.1 | 0.1 | 0.2 | 0.2 | 1.6 | 2.8 | 6.7 | 16.2 |

*in the starting material.

We claim:
1. Process for preparing a thermoplastic polymer on the basis of copolymers of vinyl monomers and unsaturated dicarboxylic anhydrides, the process comprising the steps of:
   heating a copolymer comprising vinyl monomers and unsaturated dicarboxylic anhydrides for 5 to 15 minutes at a temperature of 200° to 250° C. in the presence of a catalyst to obtain said thermoplastic polymer; and
   cooling said thermoplastic polymer.
2. Process for preparing a thermoplastic polymer on the basis of copolymers of vinyl monomers and unsatu- rated dicarboxylic an hydrides, the process comprising the steps of:

heating a copolymer comprising vinyl monomers and unsaturated dicarboxylic an hydrides for a length of time at a temperature until a remaining $CO_2$ emission of the product during heating is lower than 0.5% (wt) to thereby form said thermoplastic polymer.

3. Process for preparing a polymer according to either claim 1 or 2, wherein said vinyl monomer is at least one of styrene and α-methylstyrene.

4. Process for preparing a polymer according to either claim 1 or 2, wherein said unsaturated dicarboxylic anhydride is maleic anhydride.

5. Process for preparing a polymer according to either claim 1 or 2, wherein said unsaturated dicarboxylic anhydride is a styrene-maleic anhydride copolymer having 18–50 moles % maleic anhydride and 82–50 moles % styrene.

6. Process for preparing products from a thermoplastic polymer comprising the steps of:

preparing a thermoplastic polymer according to either claim 1 or 2; and shaping said thermoplastic polymer while cooling.

7. A process for preparing a thermoplastic polymer according to claim 1, wherein said process is carried out in solution.

8. A process for preparing a thermoplastic polymer according to claim 1, further comprising the steps of dissolving said thermoplastic polymer in a solvent and precipitating said thermoplastic polymer out of solution to remove residual monomers or catalyst from said thermoplastic polymer.

9. A process for preparing a thermoplastic polymer according to claim 2, wherein said process is carried out in solution.

10. A process for preparing a thermoplastic polymer according to claim 2, further comprising the steps of dissolving said thermoplastic polymer in a solvent and precipitating said thermoplastic polymer out of solution to remove residual monomers or catalyst from said thermoplastic polymer.

* * * * *

UNITED STATES PATENT AND TRADEMARK OFFICE
CERTIFICATE OF CORRECTION

PATENT NO. : 5,430,109
DATED : July 4, 1995
INVENTOR(S) : Duynstee, et al

It is certified that error appears in the above-indentified patent and that said Letters Patent is hereby corrected as shown below:

On the title page: Item [63] Continuation of Ser. No. 474,825, filed August 2, 1990, abandoned, which was the national stage of international application number PCT/NL89/00094, Filed December 14, 1989, --.

Signed and Sealed this

Seventeenth Day of September, 1996

Attest:

BRUCE LEHMAN

*Attesting Officer*     *Commissioner of Patents and Trademarks*